United States Patent
Hsu et al.

(10) Patent No.: US 11,791,970 B2
(45) Date of Patent: Oct. 17, 2023

(54) INTRA-PPDU RESOURCE REALLOCATION FOR MULTIPLE USERS

(71) Applicant: MEDIATEK INC., Hsin-Chu (TW)

(72) Inventors: Tsai-Yuan Hsu, Hsinchu (TW); Chien-Fang Hsu, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 0 days.

(21) Appl. No.: 17/335,104

(22) Filed: Jun. 1, 2021

(65) Prior Publication Data
US 2021/0385050 A1    Dec. 9, 2021

Related U.S. Application Data

(60) Provisional application No. 63/036,527, filed on Jun. 9, 2020.

(51) Int. Cl.
  *H04L 5/00*    (2006.01)
(52) U.S. Cl.
  CPC .......... *H04L 5/0082* (2013.01); *H04L 5/0044* (2013.01); *H04L 5/0048* (2013.01)
(58) Field of Classification Search
  None
  See application file for complete search history.

(56) References Cited

U.S. PATENT DOCUMENTS

| | | | |
|---|---|---|---|
| 2015/0009978 A1* | 1/2015 | Choi | H04L 25/0226 370/338 |
| 2020/0204417 A1* | 6/2020 | Yu | H04L 25/0226 |
| 2021/0345418 A1* | 11/2021 | Asterjadhi | H04W 74/006 |

FOREIGN PATENT DOCUMENTS

TW           202002539 A      1/2020

* cited by examiner

*Primary Examiner* — Yemane Mesfin
*Assistant Examiner* — Jeff Banthrongsack
(74) *Attorney, Agent, or Firm* — Winston Hsu

(57) ABSTRACT

The present invention provides a wireless communication method of an access point, wherein the wireless communication method comprises: generating a PPDU according to a traffic of the access point, wherein the PPDU includes a preamble and SIG field, a first data field, a midamble and SIG field and a second data field in sequence, the preamble and SIG field includes information of a first station and a first resource unit allocated to the first station, and the midamble and signal SIG field includes information of a second station and the first resource unit that is reallocated to the second station; transmitting the preamble and SIG field; using the first resource unit to transmit data corresponding to the first data field to the first station; transmitting the midamble and SIG field; and using the first resource unit to transmit data corresponding to the second data field to the second station.

14 Claims, 5 Drawing Sheets

INTRA-PPDU RESOURCE REALLOCATION FOR MULTIPLE USERS

CROSS REFERENCE TO RELATED APPLICATIONS

This application claims the priority of U.S. Provisional Application No. 63/036,527 (filed on Jun. 9, 2020), which is included herein by reference in its entirety.

BACKGROUND

In IEEE 802.11ax specification, a Wi-Fi high efficiency (HE) downlink (DL) multi-user (MU) is provided so that an access point (AP) supports downlink transmission to multiple stations in a physical layer protocol data unit (PPDU). For example, within a single PPDU, the AP can transmit a first packet, a second packet and a third packet to a first station, a second station and a third station by using different resource units (e.g., different frequency bands), respectively. However, if some of the packets is/are short packets that can be successfully transmitted within a short time, the corresponding resource unit(s) are not fully utilized, resulting in a waste of resource unit(s).

SUMMARY

It is therefore an objective of the present invention to provide a method for reallocating resource unit within a PPDU, to solve the above-mentioned problem.

According to one embodiment of the present invention, a wireless communication method of an access point comprises the steps of: generating a PPDU according to a traffic of the access point, wherein the PPDU comprises a preamble and SIG field, at least one first data field, a midamble and SIG field and at least one second data field in sequence, the preamble and SIG field comprises information of a first station and a first resource unit allocated to the first station, and the midamble and signal SIG field comprises information of a second station and the first resource unit that is reallocated to the second station; transmitting the preamble and SIG field of the PPDU; using the first resource unit to transmit data corresponding to the at least one first data field to the first station; transmitting the midamble and SIG field of the PPDU; and using the first resource unit to transmit data corresponding to the at least one second data field to the second station.

According to another embodiment of the present invention, a circuitry within an access point is configured to perform the steps of: generating a PPDU according to a traffic of the access point, wherein the PPDU comprises a preamble and SIG field, at least one first data field, a midamble and SIG field and at least one second data field in sequence, the preamble and SIG field comprises information of a first station and a first resource unit allocated to the first station, and the midamble and signal SIG field comprises information of a second station and the first resource unit that is reallocated to the second station; transmitting the preamble and SIG field of the PPDU; using the first resource unit to transmit data corresponding to the at least one first data field to the first station; transmitting the midamble and SIG field of the PPDU; and using the first resource unit to transmit data corresponding to the at least one second data field to the second station.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
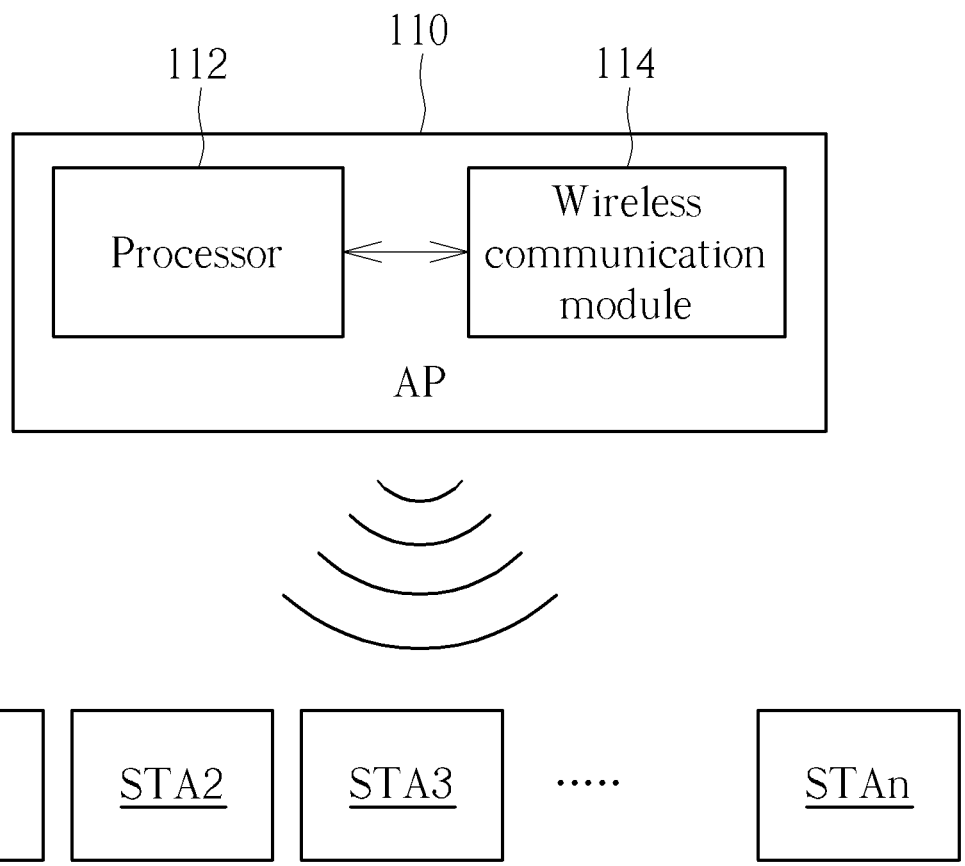
FIG. 1 is a diagram illustrating a wireless communication system according to one embodiment of the present invention.

FIG. 1 is a diagram illustrating a wireless communication system according to one embodiment of the present invention. As shown in FIG. 1, the wireless communication system comprises an AP 110 and a plurality of stations STA1-STAn, wherein the AP 110 comprises a processor 112 and a wireless communication module 114. In this embodiment, each of the stations STA1-STAn can be a cell phone, a tablet, a notebook, or any other electronic device capable of wirelessly communicating with the AP 110, and the AP 110 supports Wi-Fi HE DL MU so that the AP 110 can simultaneously transmit packets to the stations STA1-STAn.

Figure 2:
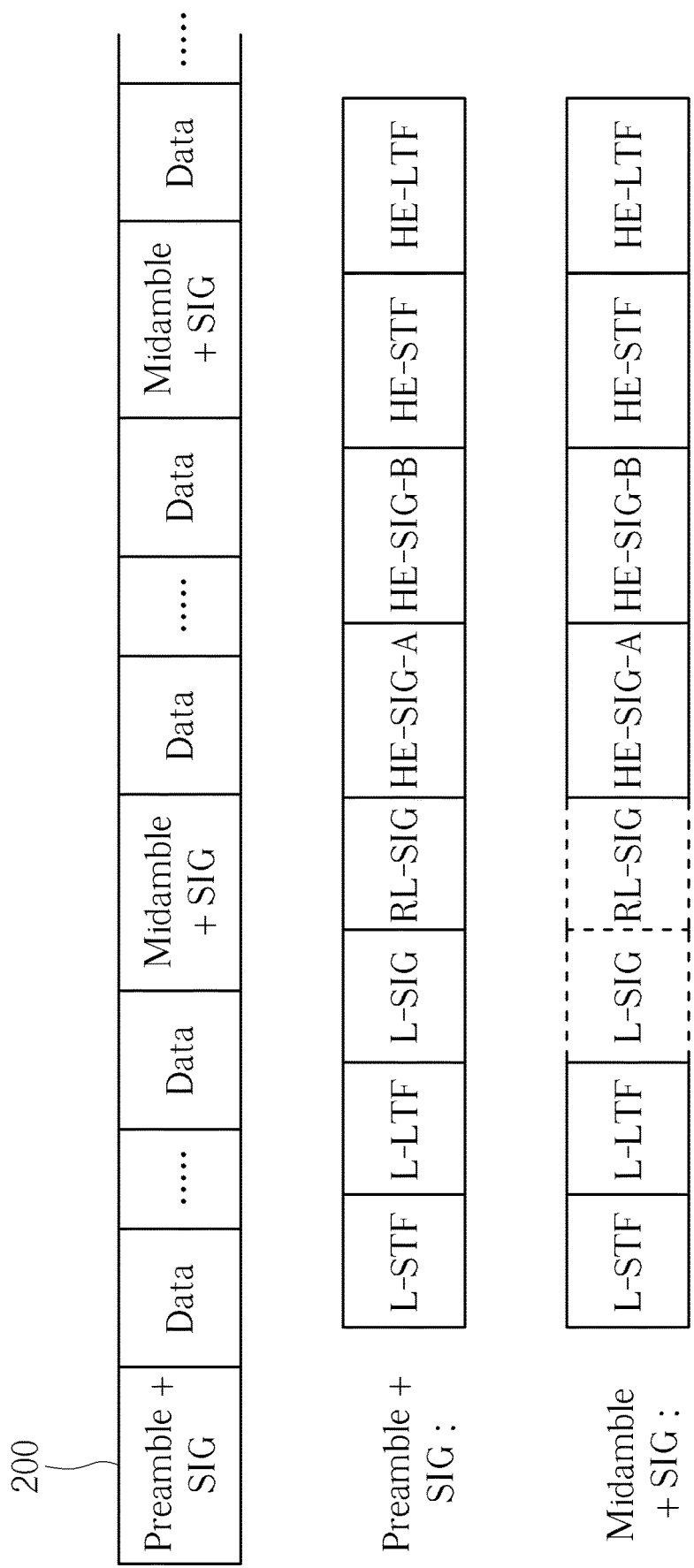
FIG. 2 shows a PPDU according to one embodiment of the present invention.

When the AP 110 needs to send data to at least part of the stations STA1-STAn, the processor 112 can schedule the packets within a PPDU and allocate resource units for the at least part of the stations STA1-STAn, wherein the resource unit may be a frequency band, a subcarrier of an Orthogonal Frequency Division Multiple Access (OFDMA) or an antenna selection, and one resource unit may be used by two or more stations at different times. Specifically, FIG. 2 shows a PPDU 200 according to one embodiment of the present invention. As shown in FIG. 2, the PPDU 200 sequentially comprises a preamble and SIG field, a plurality of data fields, a midamble and SIG field, a plurality data fields, a midamble and SIG field and a plurality data fields, wherein the preamble and SIG field comprises a L-STF field, a L-LTF field, a L-SIG field, a RL-SIG field, a HE-SIG-A field, a HE-SIG-B field, a HE-STF field and a HE-LTE field, and the midamble and SIG field comprises a L-STF field, a L-LTF field, a L-SIG field, a RL-SIG field, a HE-SIG-A field, a HE-SIG-B field, a HE-STF field and a HE-LTE field. In the preamble and SIG field, the L-STF field and the L-LTF field serve as the preamble for the stations STA1-STAn to identify the PPDU, the L-SIG field indicates a PPDU time, and the HE-SIG-B indicates the resource unit allocation for at least part of the stations STA1-STAn. In addition, in the midamble and SIG field, the L-STF field and the L-LTF field are for the stations STA1-STAn to identify the midamble, and the HE-SIG-B indicates the resource unit reallocation for at least part of the stations STA1-STAn. By using the PPDU 200 shown in FIG. 2, because the resource unit(s) can be reallocated by using the midamble and SIG field, the resource unit can be used more efficient.

In is noted that two midamble and SIG fields shown in FIG. 2 is for illustrative purposes only. In other embodiments of the present invention, the PPDU may have only one midamble and SIG field and corresponding data fields, or the PPDU may have three or more midamble and SIG fields and corresponding data fields. These alternative designs of the present invention should fall within the scope of the present invention. In addition, because the present invention focuses on the resource unit reallocation in the midamble and SIG field, and contents of the other fields are known by a person skilled in the art, the detailed description of the other fields are omitted here.

In another embodiment, the L-SIG field and the RL-SIG field can be removed from the midable and SIG field.

Figure 3:
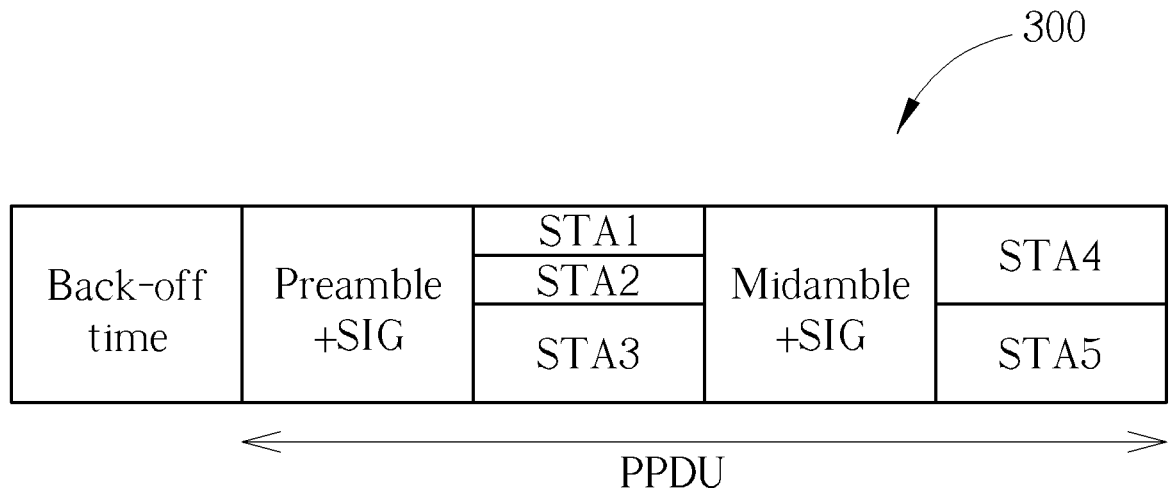
FIG. 3 shows a PPDU according to one embodiment of the present invention.

FIG. 3 shows a PPDU 300 according to one embodiment of the present invention. As shown in FIG. 3, after the processor 112 refers to a back-off time to perform time count down, the PPDU 300 starts to be broadcasted, where the preamble and SIG field comprises association IDs of part of the stations that have allocated resource units and the corresponding resource units. In this embodiment, the preamble and SIG field comprises the association IDs of the stations STA1-STA3 and three resource units, wherein a first resource unit is allocated to the station STA1, a second resource unit is allocated to the station STA2, and a third resource unit is allocated to the station STA3. Then, the stations STA1-STA3 receive the preamble and SIG field of the PPDU 300 and prepare to receive the packets by using its allocated resource unit, and the stations STA1-STA3 receive the packets from the AP 110 by using the first resource unit, the second resource unit and the third resource unit, respectively. Then, after the stations STA1-STA3 successfully receive the packets, the stations receives the midamble and SIG field, where the midamble and SIG field comprises the association IDs of the stations STA4 and STA5 and corresponding resource units, wherein the first resource unit and the second resource are reallocated to the station STA4, and the third resource unit is reallocated to the station STA5. Then, the stations STA4 and STA5 receive the midamble and SIG field of the PPDU 300 and prepare to receive the packets by using its allocated resource unit, and the station STA4 receives the packets from the AP 110 by using the first resource unit and the second resource unit, and the station STA5 receives the packet(s) from the AP 110 by using the third resource unit.

By using the embodiment shown in FIG. 3, when the packets received by the stations STA1-STA3 are short packets and a lot of PPDU time left, the AP 110 can use the midamble and SIG field to reallocate the resource units to use the remaining PPDU time efficiently. It is noted that there is no back-off time immediately before the midamble and SIG field, so that the AP 110 can reduce contention overhead to improve latency.

In some applications, the station may enter a sleep mode if its association ID does not appear in the preamble and SIG field. Therefore, the preamble and SIG field of the PPDU 300 may comprise all of the association IDs that will receive packets in the PPDU. Specifically, the preamble and SIG field of the PPDU 300 may comprise the association IDs of the stations STA1-STA5 even if no resource unit is allocated to the stations STA4 and STA5, to make that all of the stations STA1-STA5 can be maintained in normal mode without entering the sleep mode. Because the stations STA4 and STA5 do not enter the sleep mode, the stations STA4 and STA5 can successfully receive the midamble and SIG field and use the reallocated resource units to receive packets.

In another embodiment, some of the stations STA1-STAn can be grouped to correspond to a specific association ID, and if the PPDU 300 sent by the AP 110 has the midamble and SIG field for reallocating the resource units, the preamble and SIG field of the PPDU 300 may have the specific association ID to notify the stations within the group (e.g. STA1-STA5) not enter the sleep mode. Because the stations STA4 and STA5 do not enter the sleep mode due to the specific association ID in the preamble and SIG field, the stations STA4 and STA5 can successfully receive the midamble and SIG field and use the reallocated resource units to receive packets.

Figure 4:
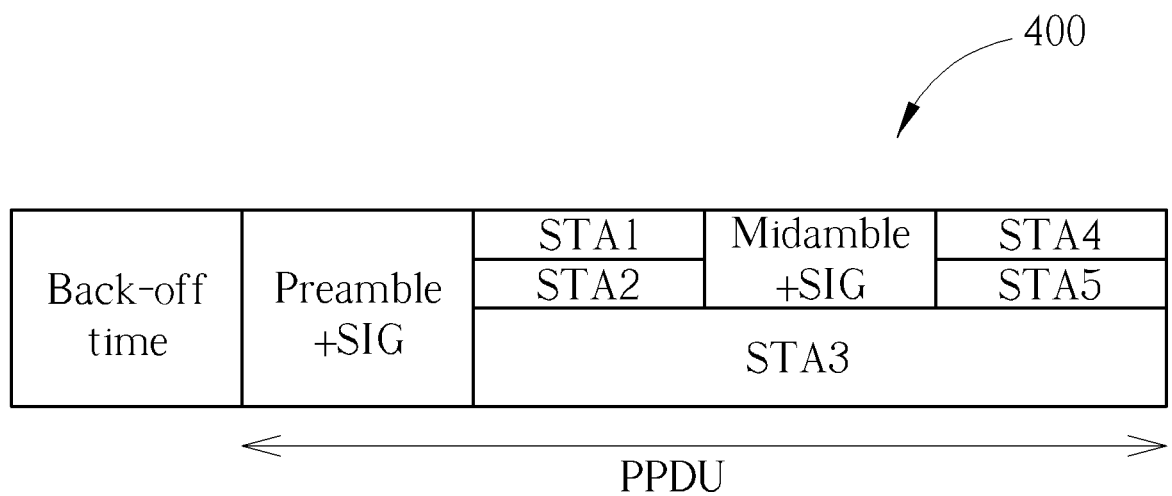
FIG. 4 shows a PPDU according to one embodiment of the present invention.

FIG. 4 shows a PPDU 400 according to one embodiment of the present invention. As shown in FIG. 4, after the processor 112 refers to a back-off time to perform time count down, the PPDU 400 starts to be broadcasted, where the preamble and SIG field comprises association IDs of part of the stations that have allocated resource units and the corresponding resource units. In this embodiment, the preamble and SIG field comprises the association IDs of the stations STA1-STA3 and three resource units, wherein a first resource unit is allocated to the station STA1, a second resource unit is allocated to the station STA2, and a third resource unit is allocated to the station STA3. Then, the stations STA1-STA3 receive the preamble and SIG field of the PPDU 400 and prepare to receive the packets by using its allocated resource unit, and the stations STA1-STA3 receive the packets from the AP 110 by using the first resource unit, the second resource unit and the third resource unit, respectively. Then, after the stations STA1 and STA2 successfully receive the packets, the stations receives the midamble and SIG field, where the midamble and SIG field comprises the association IDs of the stations STA4 and STA5 and corresponding resource units, wherein the first resource unit and the second resource are allocated to the stations STA4 and STA5. Then, the stations STA4 and STA5 receive the midamble and SIG field of the PPDU 400 and prepare to receive the packets by using its allocated resource unit, and the station STA4 receives the packet(s) from the AP 110 by using the first resource unit, and the station STA5 receives the packet(s) from the AP 110 by using the second resource unit.

By using the embodiment shown in FIG. 4, when the packets received by the stations STA1 and STA2 are short packets and a lot of PPDU time left, the AP 110 can use the midamble and SIG field to reallocate some resource units, such as the first resource unit and the second resource unit, to use the remaining PPDU time efficiently. It is noted that there is no back-off time immediately before the midamble and SIG field, so that the AP 110 can reduce contention overhead to improve latency.

In some applications, the station may enter a sleep mode if its association ID does not appear in the preamble and SIG field. Therefore, the preamble and SIG field of the PPDU 400 may comprise all of the association IDs that will receive packets in the PPDU. Specifically, the preamble and SIG field of the PPDU 400 may comprise the association IDs of the stations STA1-STA5 even if no resource unit is allocated to the stations STA4 and STA5, to make that all of the stations STA1-STA5 can be maintained in normal mode without entering the sleep mode. Because the stations STA4 and STA5 do not enter the sleep mode, the stations STA4 and STA5 can successfully receive the midamble and SIG field and use the reallocated resource units to receive packets.

In another embodiment, some of the stations STA1-STAn can be grouped to correspond to a specific association ID, and if the PPDU 400 sent by the AP 110 has the midamble and SIG field for reallocating the resource units, the preamble and SIG field of the PPDU 400 may have the specific association ID to notify the stations within the group (e.g. STA1-STA5) not enter the sleep mode. Because the stations STA4 and STA5 do not enter the sleep mode due to the specific association ID in the preamble and SIG field, the stations STA4 and STA5 can successfully receive the midamble and SIG field and use the reallocated resource units to receive packets.

Figure 5:
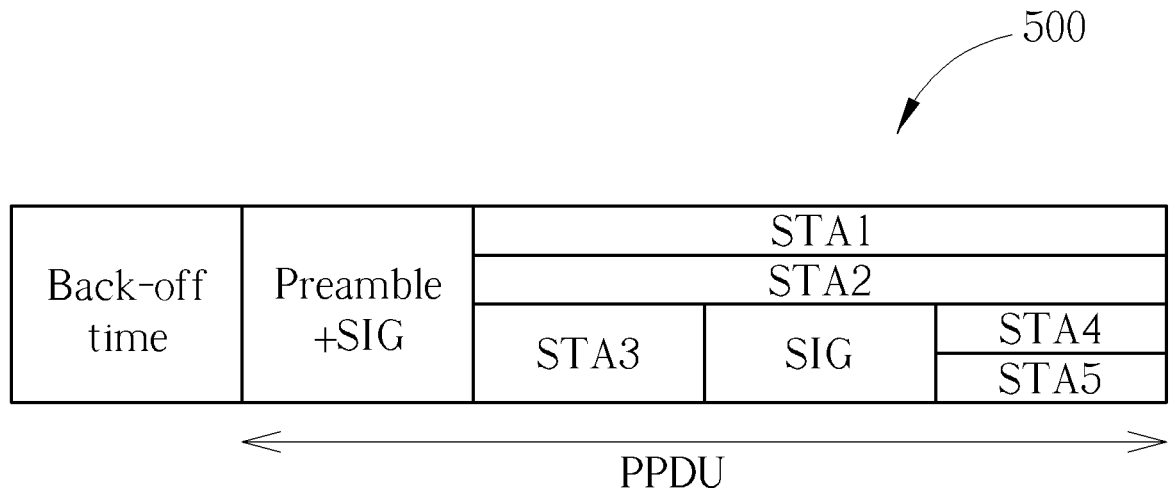
FIG. 5 shows a PPDU according to one embodiment of the present invention.

FIG. 5 shows a PPDU 500 according to one embodiment of the present invention. As shown in FIG. 5, after the processor 112 refers to a back-off time to perform time count down, the PPDU 500 starts to be broadcasted, where the preamble and SIG field comprises association IDs of part of the stations that have allocated resource units and the corresponding resource units. In this embodiment, the preamble and SIG field comprises the association IDs of the stations STA1-STA3 and four resource units, wherein a first resource unit is allocated to the station STA1, a second resource unit is allocated to the station STA2, and a third resource unit and a fourth resource unit are allocated to the station STA3. Then, the stations STA1-STA3 receive the preamble and SIG field of the PPDU 500 and prepare to receive the packets by using its allocated resource unit, and the stations STA1-STA3 receive the packets from the AP 110 by using the first resource unit, the second resource unit, the third resource unit and the fourth resource unit, respectively. Then, after the station STA3 successfully receive the packets, the stations receives the SIG field, where the SIG field is a legacy SIG field that is for the stations that do not support the Wi-Fi HE DL MU standard, and the SIG field comprises the association IDs of the stations STA4 and STA5 and corresponding resource units, wherein the third resource unit and the fourth resource are allocated to the stations STA4 and STA5, respectively. Then, the stations STA4 and STA5 receive the SIG field of the PPDU 500 and prepare to receive the packets by using its allocated resource unit, and the station STA4 receives the packet(s) from the AP 110 by using the third resource unit, and the station STA5 receives the packet(s) from the AP 110 by using the fourth resource unit.

By using the embodiment shown in FIG. 5, when the packet received by the station STA3 is short packet and a lot of PPDU time left, and the other stations STA4 and STA5 do not support the Wi-Fi HE DL MU standard, the AP 110 can use the legacy SIG field to reallocate some resource units, such as the three resource unit and the fourth resource unit, to use the remaining PPDU time efficiently. It is noted that there is no back-off time immediately before the SIG field, so that the AP 110 can reduce contention overhead to improve latency.

Figure 6:
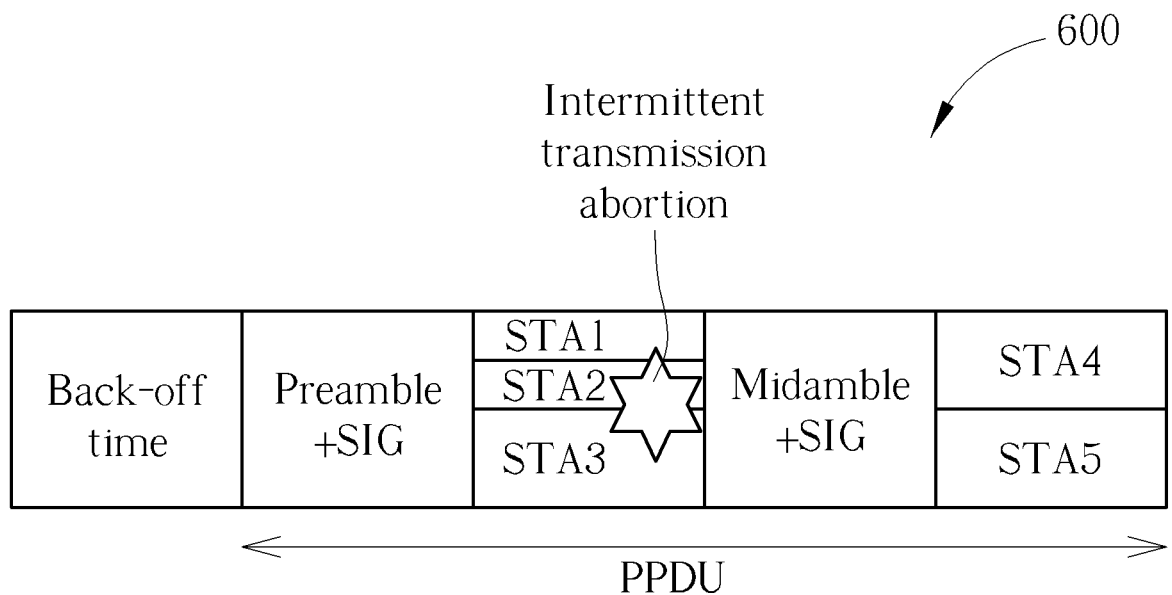
FIG. 6 shows a PPDU according to one embodiment of the present invention.

FIG. 6 shows a PPDU 600 according to one embodiment of the present invention. As shown in FIG. 6, after the processor 112 refers to a back-off time to perform time count down, the PPDU 600 starts to be broadcasted, where the preamble and SIG field comprises association IDs of part of the stations that have allocated resource units and the corresponding resource units. In this embodiment, the preamble and SIG field comprises the association IDs of the stations STA1-STA3 and three resource units, wherein a first resource unit is allocated to the station STA1, a second resource unit is allocated to the station STA2, and a third resource unit is allocated to the station STA3. Then, the stations STA1-STA3 receive the preamble and SIG field of the PPDU 600 and prepare to receive the packets by using its allocated resource unit, and the stations STA1-STA3 receive the packets from the AP 110 by using the first resource unit, the second resource unit and the third resource unit, respectively. At this time, if an intermittent transmission abortion occurs because co-located radio is granted for the permission of transmission or reception, the midamble and SIG field is sent by the AP 110 to perform the resource unit reallocation, and the midamble and SIG field comprises the association IDs of the stations STA4 and STA5 and corresponding resource units, wherein the first resource unit and the second resource are allocated to the station STA4, and the third resource unit is allocated to the station STA5. Then, the stations STA4 and STA5 receive the midamble and SIG field of the PPDU 600 and perform the channel estimation to prepare to receive the packets by using its allocated resource unit, and the station STA4 receives the packets from the AP 110 by using the first resource unit and the second resource unit, and the station STA5 receives the packet(s) from the AP 110 by using the third resource unit.

By using the embodiment shown in FIG. 6, when the packet transmission of the stations STA1-STA3 fails, the AP 110 can use the midamble and SIG field to reallocate the resource units to use the remaining PPDU time efficiently. It is noted that there is no back-off time immediately before the midamble and SIG field, so that the AP 110 can reduce contention overhead to improve latency.

In this embodiment, the preamble and SIG field of the PPDU 600 may comprise all of the association IDs that will receive packets in the PPDU. Specifically, the preamble and SIG field of the PPDU 600 may comprise the association IDs of the stations STA1-STA5 even if no resource unit is allocated to the stations STA4 and STA5, to make that all of the stations STA1-STA5 can be maintained in normal mode without entering the sleep mode. Because the stations STA4 and STA5 do not enter the sleep mode, the stations STA4 and STA5 can successfully receive the midamble and SIG field and use the reallocated resource units to receive packets.

In another embodiment, some of the stations STA1-STAn can be grouped to correspond to a specific association ID, and if the PPDU 600 sent by the AP 110 has the midamble and SIG field for reallocating the resource units, the preamble and SIG field of the PPDU 600 may have the specific association ID to notify the stations within the group (e.g. STA1-STA5) not enter the sleep mode. Because the stations STA4 and STA5 do not enter the sleep mode due to the specific association ID in the preamble and SIG field, the stations STA4 and STA5 can successfully receive the midamble and SIG field and use the reallocated resource units to receive packets.

Figure 7:
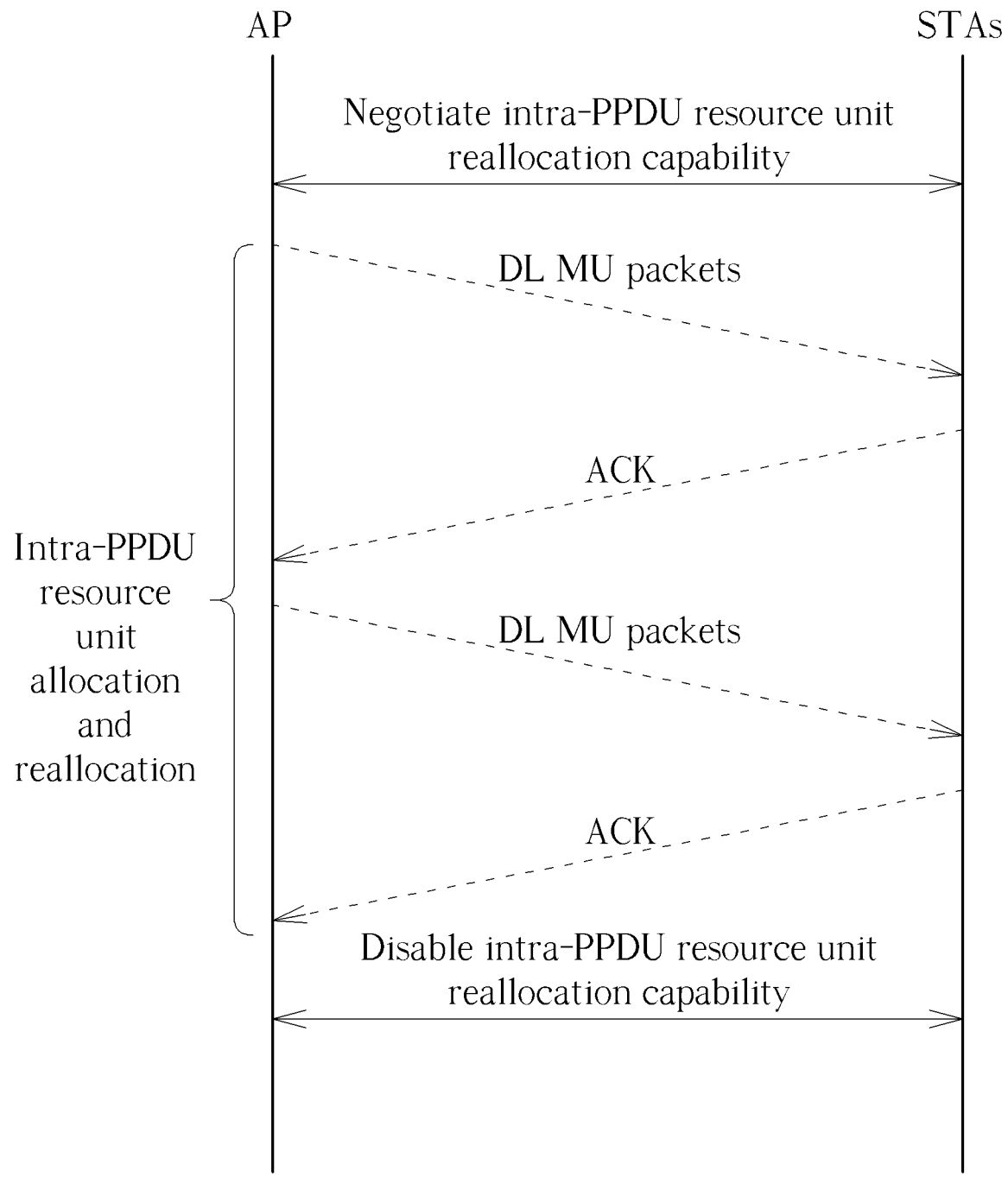
FIG. 7 is a flowchart of communications between the AP and the stations according to one embodiment of the present invention.

FIG. 7 is a flowchart of communications between the AP 110 and the stations according to one embodiment of the present invention. As shown in FIG. 7, initially the AP 110 and the stations STA1-STAn negotiate intra-PPDU resource units reallocation capability, for the AP 110 to determine which stations support the intra-PPDU resource unit reallocation and which stations do not support the intra-PPDU resource unit reallocation, then the AP 110 may assign a specific association ID to a group of stations that support the intra-PPDU resource unit reallocation. Then, the AP 110 schedules the resource units to at least part of the stations based on a traffic buffer within the AP 110, and starts to broadcast the PPDU such as the PPDU 300/400/500/600. Based on the preamble and SIG field of the PPDU, a first portion of the stations receive the DL MU packets by using the allocated resources, and the first portion of the stations respond an acknowledge (ACK) after receiving the packets successfully. Then, based on the midamble and SIG field of the PPDU, a second portion of the stations receive the DL MU packets by using the reallocated resources, and the second portion of the stations respond an acknowledge (ACK) after receiving the packets successfully. Finally the AP 110 may disable the intra-PPDU resource unit reallocation capability.

Briefly summarized, in the method for reallocating resource unit within a PPDU of the present invention, the AP can use the midamble and SIG field within the PPDU to reallocate the resource units to the other stations. Therefore, since one resource unit may be used by two stations for data transmission within the PPDU, the data transmission between the AP becomes more efficient.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method of an access point, comprising:
    generating a physical layer protocol data unit (PPDU) according to a traffic of the access point, wherein the PPDU comprises a preamble with signal (SIG) field, at least one first data field, a midamble with SIG field and at least one second data field in sequence, the preamble with SIG field comprises information of a first station and a first resource unit allocated to the first station, and the midamble with SIG field comprises information of a second station and at least a part of the first resource unit that is reallocated to the second station;
    transmitting the preamble with SIG field of the PPDU;
    using the first resource unit to transmit data corresponding to the at least one first data field to the first station;
    transmitting the midamble with SIG field of the PPDU; and
    using the part of the first resource unit to transmit data corresponding to the at least one second data field to the second station;
    wherein the preamble with SIG field of the PPDU comprises a first association identity (ID) of the first station, and the midamble with SIG field of the PPDU comprises a second association ID of the second station; and there is no data field corresponding to the second station between the preamble with SIG field and the midamble with SIG field of the PPDU.

2. The wireless communication method of claim 1, wherein there is no back-off time immediately before the midamble with SIG field.

3. The wireless communication method of claim 1, wherein the preamble with SIG field of the PPDU comprises the first association ID of the first station and the second association ID of the second station.

4. The wireless communication method of claim 1, wherein the preamble with SIG field further comprises information of a third station and a second resource unit allocated to the third station, and the midamble with SIG field further comprises information of the second resource unit that is reallocated to the second station.

5. The wireless communication method of claim 4, further comprising:
    using the second resource unit to transmit data to the third station; and
    the step of using the first resource unit to transmit the data corresponding to the at least one second data field to the second station comprises:
        using the first resource unit and the second resource unit to transmit the data corresponding to the at least one second data field to the second station.

6. The wireless communication method of claim 1, wherein the PPDU further comprises at least one third data field, the preamble with SIG field further comprises a third station and a second resource unit allocated to the third station, and the wireless communication method further comprises:
    using the second resource unit to transmit data corresponding to the at least one third data field to the third station;
    wherein the second resource is not reallocated in the midamble with SIG field.

7. The wireless communication method of claim 1, wherein the preamble with SIG field further comprises information of a second resource unit allocated to the first station, and the midamble with SIG field comprises information of a third station and the second resource unit that is reallocated to the third station.

8. An access point comprising a circuitry, configured to perform the steps of:
    generating a physical layer protocol data unit (PPDU) according to a traffic of the access point, wherein the PPDU comprises a preamble with signal (SIG) field, at least one first data field, a midamble with SIG field and at least one second data field in sequence, the preamble with SIG field comprises information of a first station and a first resource unit allocated to the first station, and the midamble with SIG field comprises information of a second station and at least a part of the first resource unit that is reallocated to the second station;
    transmitting the preamble with SIG field of the PPDU;
    using the first resource unit to transmit data corresponding to the at least one first data field to the first station;
    transmitting the midamble with SIG field of the PPDU; and
    using the part of the first resource unit to transmit data corresponding to the at least one second data field to the second station;
    wherein the preamble with SIG field of the PPDU comprises a first association identity (ID) of the first station, and the midamble with SIG field of the PPDU comprises a second association ID of the second station; and there is no data field corresponding to the second station between the preamble with SIG field and the midamble with SIG field of the PPDU.

9. The access point of claim 8, wherein there is no back-off time immediately before the midamble with SIG field.

10. The access point of claim 8, wherein the preamble with SIG field of the PPDU comprises the first association ID of the first station and the second association ID of the second station.

11. The access point of claim 8, wherein the preamble with SIG field further comprises information of a third station and a second resource unit allocated to the third station, and the midamble with SIG field further comprises information of the second resource unit that is reallocated to the second station.

12. The access point of claim 11, further configured to perform the steps of:
   using the second resource unit to transmit data to the third station; and
   the step of using the first resource unit to transmit the data corresponding to the at least one second data field to the second station comprises:
      using the first resource unit and the second resource unit to transmit the data corresponding to the at least one second data field to the second station.

13. The access point of claim 8, wherein the PPDU further comprises at least one third data field, the preamble with SIG field further comprises a third station and a second resource unit allocated to the third station, and the wireless communication method further comprises:
   using the second resource unit to transmit data corresponding to the at least one third data field to the third station;
   wherein the second resource is not reallocated in the midamble with SIG field.

14. The access point of claim 8, wherein the preamble with SIG field further comprises information of a second resource unit allocated to the first station, and the midamble with SIG field comprises information of a third station and the second resource unit that is reallocated to the third station.

* * * * *